(12) United States Patent (10) Patent No.: US 12,632,286 B1
Raymond et al. (45) Date of Patent: May 19, 2026

(54) DYNAMIC TASK PRIORITY ASSIGNMENTS IN WAREHOUSE

(71) Applicant: JDA Software Group, Inc., Scottsdale, AZ (US)

(72) Inventors: Vincent Raymond, Montréal (CA); Phillipe Grangier, Montréal (CA); Marc Brisson, Boucherville (CA); Steven Cheney, Waukesha, WI (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 123 days.

(21) Appl. No.: 15/945,096

(22) Filed: Apr. 4, 2018

Related U.S. Application Data

(60) Provisional application No. 62/481,234, filed on Apr. 4, 2017.

(51) Int. Cl.
   G06F 9/48 (2006.01)
   G06F 9/54 (2006.01)
(52) U.S. Cl.
   CPC ............ G06F 9/4818 (2013.01); G06F 9/544 (2013.01)
(58) Field of Classification Search
   CPC ................................ G06F 9/4818; G06F 9/544
   USPC ......................................................... 705/7.13
   See application file for complete search history.

(56) References Cited

U.S. PATENT DOCUMENTS 4,145,735 A * 3/1979 Soga ..................... G06F 9/4837
                                                                      710/264
5,984,499 A * 11/1999 Nourse ................... G06F 9/545
                                                                      718/107

6,750,766 B1 * 6/2004 Heitner ................. G06Q 10/06
                                                                      700/83
7,099,745 B2 * 8/2006 Ebert ................... G05D 1/0088
                                                                      701/16
7,113,915 B1 * 9/2006 Montemayor ......... G06Q 10/06
                                                                      705/7.13
7,151,973 B1 * 12/2006 Moll ..................... G06Q 10/06
                                                                      700/106
7,970,639 B2 * 6/2011 Vucina ............. G06Q 10/06311
                                                                      705/7.13
8,225,319 B2 * 7/2012 Laithwaite ....... G06Q 10/06375
                                                                      718/103
8,494,673 B2 * 7/2013 Miranda .............. B65G 1/1378
                                                                      700/214

(Continued)

FOREIGN PATENT DOCUMENTS

CN        106295927 A * 1/2017
EP        3331668 B1 * 7/2020 .............. B25J 5/007

OTHER PUBLICATIONS

Monori, Ákos. "Task assignment optimization in SAP Extended Warehouse Management." (2008). (Year: 2008).*

(Continued)

*Primary Examiner* — Kristin E Gavin
(74) *Attorney, Agent, or Firm* — Spencer Fane LLP; Steven J. Laureanti

(57) ABSTRACT

A system and method are disclosed for a warehouse management system having a task database and a server comprising a processor and memory. The system groups one or more tasks from the task database into one or more groups, estimate the latest feasible start time for each group of the one or more groups and assigns a priority for the one or more tasks in each group based, at least in part, on the estimated latest feasible start time for each group.

15 Claims, 4 Drawing Sheets

(56) References Cited

U.S. PATENT DOCUMENTS

| | | | | |
|---|---|---|---|---|
| 8,776,076 | B2 * | 7/2014 | Chi | G06Q 50/10 |
| | | | | 709/224 |
| 9,141,433 | B2 * | 9/2015 | Doyle | G06F 9/5072 |
| 9,671,776 | B1 * | 6/2017 | Beard | G05B 19/41885 |
| 10,089,586 | B2 * | 10/2018 | Vestal | G06Q 10/063114 |
| 10,162,341 | B2 * | 12/2018 | Norman | G06F 9/505 |
| 2005/0154625 | A1 * | 7/2005 | Chua | G06Q 10/06 |
| | | | | 700/100 |
| 2007/0094661 | A1 * | 4/2007 | Baird | G06Q 10/06 |
| | | | | 718/102 |
| 2007/0185754 | A1 * | 8/2007 | Schmidt | G06Q 10/0631 |
| | | | | 705/7.26 |
| 2008/0134193 | A1 * | 6/2008 | Corley | G06F 9/52 |
| | | | | 718/104 |
| 2009/0150209 | A1 * | 6/2009 | Levine | G06Q 10/06 |
| | | | | 705/7.13 |
| 2013/0151298 | A1 * | 6/2013 | Davis | G06Q 10/063116 |
| | | | | 705/7.14 |
| 2014/0136255 | A1 * | 5/2014 | Grabovski | G06Q 10/063114 |
| | | | | 705/7.14 |
| 2016/0364263 | A1 * | 12/2016 | Cao | G06F 9/4881 |
| 2018/0005173 | A1 * | 1/2018 | Elazary | G06Q 10/087 |
| 2018/0151946 | A1 * | 5/2018 | Grohman | H02J 3/14 |
| 2018/0285149 | A1 * | 10/2018 | Bhandari | G06F 9/451 |

OTHER PUBLICATIONS

Zhang, Yu, and Lynne E. Parker. "Multi-robot task scheduling." 2013 IEEE international conference on robotics and automation. IEEE, 2013. (Year: 2013).*

Ulusoy, G., and Ü. Bilge. "Simultaneous scheduling of machines and automated guided vehicles." The International Journal of Production Research 31.12 (1993): 2857-2873. (Year: 1993).*

Briskorn, Dirk, Andreas Drexl, and Sönke Hartmann. "Inventory-based dispatching of automated guided vehicles on container terminals." OR Spectrum 28.4 (2006): 611-630. (Year: 2006).*

Van den Berg, Jeroen P., and Willem HM Zijm. "Models for warehouse management: Classification and examples." International journal of production economics 59.1-3 (1999): 519-528. (Year: 1999).*

Chung, Jaewoo, and Jose MA Tanchoco. "Material handling automation in production and warehouse systems." Springer handbook of automation. Berlin, Heidelberg: Springer Berlin Heidelberg, 2009. 961-979. (Year: 2009).*

* cited by examiner

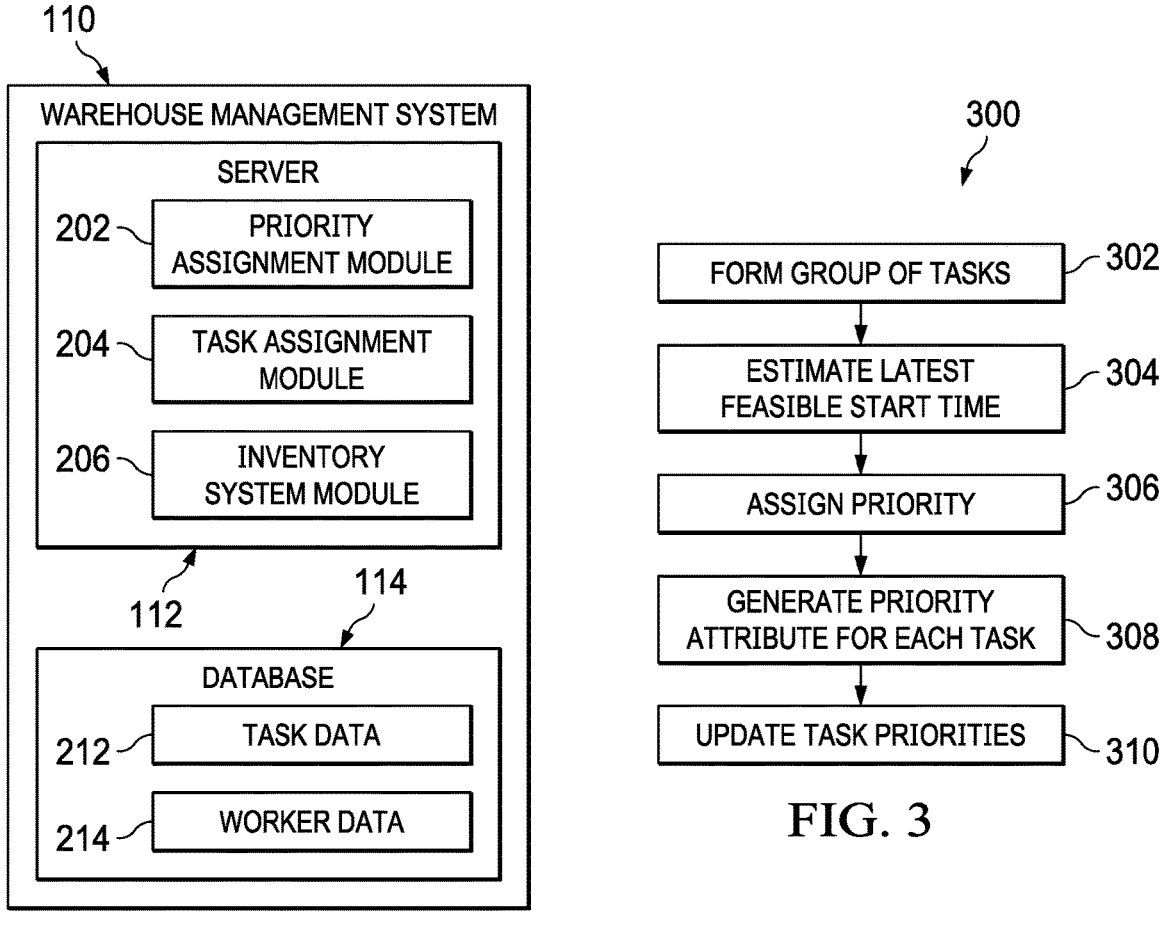
FIG. 2
FIG. 3
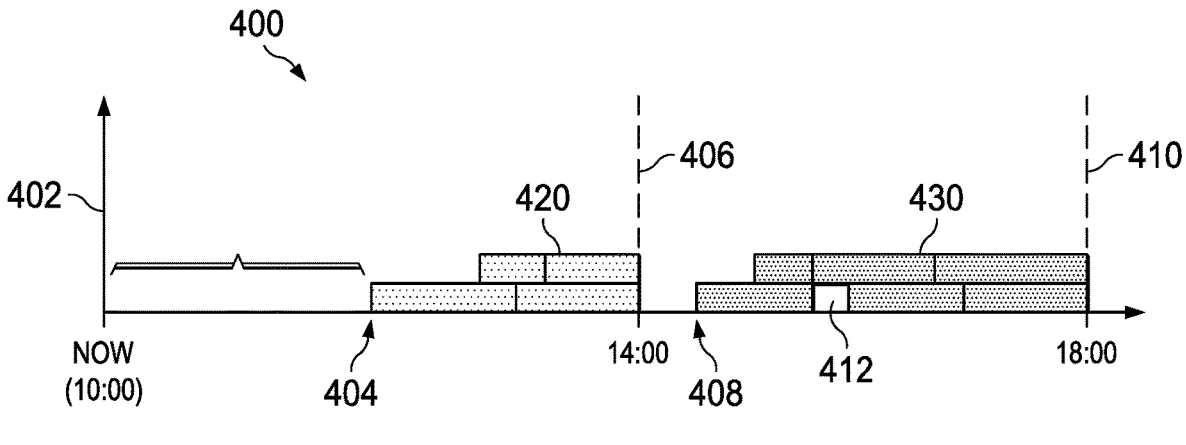
FIG. 4

DYNAMIC TASK PRIORITY ASSIGNMENTS IN WAREHOUSE

CROSS-REFERENCE TO RELATED APPLICATIONS

The present disclosure is related to that disclosed in the U.S. Provisional Application No. 62/481,234, filed Apr. 4, 2017, entitled "Dynamic Task Priority Assignments in Warehouse." U.S. Provisional Application No. 62/481,234 is assigned to the assignee of the present application. The subject matter disclosed in U.S. Provisional Application No. 62/481,234 is hereby incorporated by reference into the present disclosure as if fully set forth herein. The present invention hereby claims priority under 35 U.S.C. § 119(e) to U.S. Provisional Application No. 62/481,234.

TECHNICAL FIELD

The present disclosure relates generally to warehouse system management and specifically to dynamic task prioritization and assignment.

BACKGROUND

Traditional warehouse management systems calculate a priority of tasks to determine which tasks need to be completed next. The priority of the task increases linearly over time from its base priority until it reaches a maximum priority. However, this method of assigning priority does not take into account the current state of a warehouse, only the time of when the task was created in the system. The inability to take into account the current state of a warehouse in calculating a priority of tasks is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 2 illustrates the warehouse management system and the one or more instruction rendering devices of FIG. 1 in greater detail, in accordance with an embodiment;

FIG. 3 illustrates an exemplary method of priority assignment according to an embodiment;

FIG. 4 illustrates an exemplary visualization representing the latest feasible start time of the groups of tasks of TABLE 1 according to an embodiment;

DETAILED DESCRIPTION

Figure 1:
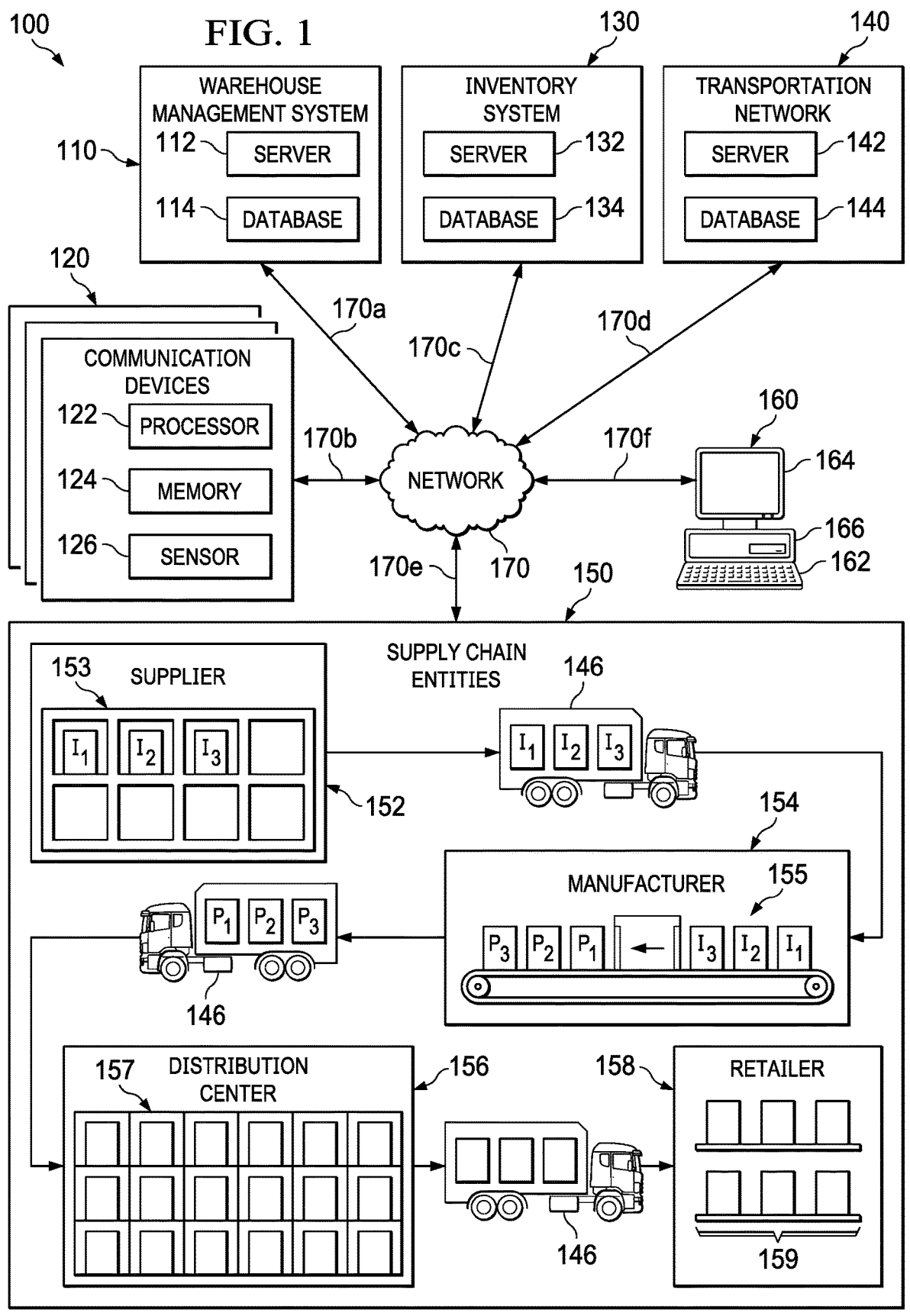
FIG. 1 illustrates an exemplary supply chain network according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, one or more disclosed embodiments comprise a warehouse management system that dynamically assigns tasks by taking into account the state, the processing capacity of the warehouse and the precedence constraints and due times of the tasks.

FIG. 1 illustrates exemplary system 100 according to an embodiment. System 100 comprises warehouse management system 110, one or more communication devices 120, inventory system 130, transportation network 140, one or more supply chain entities 150, computer 160, network 170, and communication links 170a-170f. Although a single warehouse management system 110, one or more communication devices 120, a single inventory system 130, a single transportation network 140, one or more supply chain entities 150, a single computer 160, and a single network 170, are shown and described, embodiments contemplate any number of warehouse management systems, communication devices, inventory systems, transportation systems, supply chain entities, computers, or networks, according to particular needs.

In one embodiment, warehouse management system 110 comprises server 112 and database 114. According to embodiments, server 112 comprises one or more modules that manage and operate warehouse operations, generate picking tasks, controls inventory and transportation management. According to embodiments, warehouse management system 110 receives tasks from one or more supply chain entities 150, and stores tasks and related task attributes in database 114. Database 114 comprises one or more databases or other data storage arrangements at one or more locations local to or remote from the warehouse management system 110. As described more fully below, warehouse management system 110 warehouse management system dynamically assigns priorities to tasks and then tasks to workers.

Inventory system 130 comprises server 132 and database 134. Server 132 of inventory system 130 is configured to receive and transmit item data, including item identifiers, inventory levels, and other like data about one or more items at one or more locations in the one or more supply chain entities 150. Server 132 stores and retrieves item data from database 134 or from one or more locations in system 100.

One or more communication devices 120 comprise one or more processors 122, memory 124, one or more sensors 126, and may include any suitable input device, output device, fixed or removable computer-readable storage media, or the like. According to embodiments, one or more communication devices 120 comprise an electronic device that receives imaging information from one or more sensors 126 or from one or more databases in system 100. According to embodiments, one or more communication devices 120 identify items near one or more sensors 126 and generate a mapping of the item in system 100. As explained in more detail below, warehouse management system 110, one or more communication devise 120, inventory system 130, and transportation network 140 may use the mapping of an item to locate the item in system 100. The location of the item is then used to coordinate the storage and transportation of items in system 100 to implement a shipping and inventory plan determined by warehouse management system 110 and/or one or more other factors described herein.

One or more communication devices 120 may comprise a mobile handheld electronic device such as, for example, a smartphone, a tablet computer, a wireless device, or the like. In addition, or as an alternative, one or more communication devices 120 comprise one or more networked electronic devices configured to transmit item identity information to one or more databases as an item passes by or is scanned by sensor 126. This may include, for example, a stationary scanner located at one or more supply chain entities 150 that identifies items as the items pass near the scanner. One or more sensors 126 of one or more communication devices 120 may comprise an imaging sensor, such as, a camera, scanner, electronic eye, photodiode, charged coupled device (CCD), or any other electronic sensor that detects images of objects. In addition, or as an alternative, one or more sensors 126 may comprise a radio receiver and/or transmitter 208 configured to read an electronic tag, such as, for example, a radio-frequency identification (RFID) tag.

In addition, or as an alternative, each of the one or more items may be represented in system 100 by an identifier, including, for example, Stock-Keeping Unit (SKU), Universal Product Code (UPC), serial number, barcode, tag, RFID, or any other object that encodes identifying information. As discussed above, one or more communication devices 120 may generate a mapping of one or more items in the system 100 by scanning an identifier or object associated with an item and identifying the item based, at least in part, on the scan. Additionally, one or more sensors 126 of one or more communication devices 120 may be located at one or more locations local to, or remote from, the one or more communication devices 120, including, for example, one or more sensors 126 integrated into one or more communication devices 120 or one or more sensors 126 distantly located from one or more communication devices 120 and communicatively coupled to the one or more communication devices 120. According to some embodiments, one or more sensors 126 of one or more communication devices 120, and any additional sensors local to, or remote from, system 100 may be communicatively coupled such that any sensor may be configured to communicate directly or indirectly with one or more of warehouse management system 110, one or more communication devices 120, inventory system 130, transportation network 140, one or more supply chain entities 150, computer 160, and/or network 170 using one or more communication links 170a-170f.

Transportation network 140 comprises server 142 and database 144. According to embodiments, transportation network 140 directs one or more transportation vehicles 146 to ship one or more items between one or more supply chain entities 150, based, at least in part, on a task and inventory plan determined by warehouse management system 110, the number of items currently in stock at one or more supply chain entities 150, the number of items currently in transit in the transportation network 140, forecasted demand, a supply chain disruption, and/or one or more other factors described herein. Transportation vehicles 146 comprise, for example, any number of trucks, cars, vans, boats, airplanes, unmanned aerial vehicles (UAVs), cranes, robotic machinery, or the like. Transportation vehicles 146 may comprise radio, satellite, or other communication that communicates location information (such as, for example, geographic coordinates, distance from a location, global positioning satellite (GPS) information, or the like) with warehouse management system 110, one or more communication devices 120, inventory system 130, transportation network 140, and/or one or more supply chain entities 150 to identify the location of the transportation vehicle 156 and the location of any inventory or shipment located on the transportation vehicle 156.

As shown in FIG. 1, system 100 operates on one or more computers 160 that are integral to or separate from the hardware and/or software that support warehouse management system 110, one or more communication devices 120, inventory system 130, transportation network 140, and one or more supply chain entities 150. System 100 comprising warehouse management system 110, one or more communication devices 120, inventory system 130, transportation network 140, and one or more supply chain entities 150 may operate on one or more computers 160 that are integral to or separate from the hardware and/or software that support warehouse management system 110, one or more communication devices 120, inventory system 130, transportation network 140, and one or more supply chain entities 150. Computers 160 may include any suitable input device 162, such as a keypad, mouse, touch screen, microphone, or other device to input information. Output device 164 may convey information associated with the operation of system 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to system 100.

Computer 160 may include one or more processors 166 and associated memory to execute instructions and manipulate information according to the operation of system 100 and any of the methods described herein. In addition, or as an alternative, embodiments contemplate executing the instructions on computer 160 that cause computer 160 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, system 100 may comprise a cloud-based computing system having processing and storage devices at one or more locations, local to, or remote from warehouse management system 110, one or more communication devices 120, inventory system 130, transportation network 140, and one or more supply chain entities 150. In addition, each of the one or more computers 160 may be a work station, personal computer (PC), network computer, notebook computer, tablet, personal digital assistant (PDA), cell phone, telephone, smartphone, wireless data port, mobile device, head-mounted display, augmented or virtual reality headset, or any other suitable computing device. In an embodiment, one or more users may be associated with the inventory planer 110, one or more communication devices 120, inventory system 130, transportation network 140, and one or more supply chain entities 150. These one or more users may include, for example, a "manager" or a "planner" that dynamically assigns priorities to tasks and then tasks to workers and/or one or more related tasks within system 100. In addition, or as an alternative, these one or more users within the system may include, for example, one or more computers 160 programmed to autonomously handle, among other things, determining and assigning priority to tasks, group tasks, assign a priority to the tasks in the group and assign tasks to workers and/or one or more related tasks within system 100.

One or more supply chain entities 150 represent one or more supply chain networks, including one or more enterprises, such as, for example networks of one or more suppliers 152, manufacturers 154, distribution centers 156, retailers 158 (including brick and mortar and online stores), customers, and/or the like. Suppliers 152 may be any suitable entity that offers to sell or otherwise provides one or more items (i.e., materials, components, or products) to one or more manufacturers 154. Suppliers 152 may comprise automated distribution systems 153 that automatically transport products to one or more manufacturers 154 based, at least in part, on a shipping and inventory plan determined by warehouse management system 110 and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in system 100, such as retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery 155 that produce products based, at least in part, on a shipping and inventory plan determined by warehouse management system 110 and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in system 100 and store and transport the product for a second one or more supply chain entities 150. Distribution centers 156 may comprise automated warehousing systems 157 that automatically remove products from and place products into inventory based, at least in part, on a shipping and inventory plan determined by warehouse management system 110 and/or one or more other factors described herein.

Retailers 158 may be any suitable entity that obtains one or more products to sell to one or more customers. Retailers 158 may comprise any online or brick-and-mortar store, including stores with shelving systems 159. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of retailers 158 based on computer-generated instructions or automatically by machinery to place products in a desired location in retailers 158 and which may be based, at least in part, on a shipping and inventory plan determined by warehouse management system 110 and/or one or more other factors described herein.

Although one or more supply chain entities 150 are shown and described as separate and distinct entities, the same entity may simultaneously act as any one of the one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a system 100 is shown and described, embodiments contemplate any configuration of system 100, without departing from the scope described herein.

In one embodiment, warehouse management system 110 may be coupled with network 170 using communications link 170a, which may be any wireline, wireless, or other link suitable to support data communications between warehouse management system 110 and network 170 during operation of system 100. One or more communication devices 120 are coupled with network 170 using communications link 170b, which may be any wireline, wireless, or other link suitable to support data communications between one or more communication devices 120 and network 170 during operation of distributed system 100. Inventory system 130 may be coupled with network 170 using communications link 170c, which may be any wireline, wireless, or other link suitable to support data communications between inventory system 130 and network 170 during operation of system 100. Transportation network 140 may be coupled with network 170 using communications link 170d, which may be any wireline, wireless, or other link suitable to support data communications between transportation network 140 and network 170 during operation of system 100. One or more supply chain entities 150 may be coupled with network 170 using communications link 170e, which may be any wireline, wireless, or other link suitable to support data communications between one or more supply chain entities 150 and network 170 during operation of system 100. Computer 160 may be coupled with network 170 using communications link 170f, which may be any wireline, wireless, or other link suitable to support data communications between computer 160 and network 170 during operation of system 100.

Although communication links 170a-170f are shown as generally coupling one or warehouse management system 110, one or more communication devices 120, inventory system 130, transportation network 140, one or more supply chain entities 150, and computer 160 to network 170, any of warehouse management system 110, one or more communication devices 120, inventory system 130, transportation network 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling warehouse management system 110, one or more communication devices 120, inventory system 130, transportation network 140, one or more supply chain entities 150, and computer 160. For example, data may be maintained locally to, or externally of, warehouse management system 110, one or more communication devices 120, inventory system 130, transportation network 140, one or more supply chain entities 150, and computer 160 and made available to one or more associated users of warehouse management system 110, one or more communication devices 120, inventory system 130, transportation network 140, one or more supply chain entities 150, and computer 160 using network 170 or in any other appropriate manner. For example, data may be maintained in a cloud database at one or more locations external to warehouse management system 110, one or more communication devices 120, inventory system 130, transportation network 140, one or more supply chain entities 150, and computer 160 and made available to one or more associated users of warehouse management system 110, one or more communication devices 120, inventory system 130, transportation network 140, one or more supply chain entities 150, and computer 160 using the cloud or in any other appropriate manner. Those skilled in the art will recognize that the complete structure and operation of network 170 and other components within system 100 are not depicted or described. Embodiments may be employed in conjunction with known communications networks and other components.

In accordance with the principles of embodiments described herein, warehouse management system 110 may group tasks and then assign a priority to the tasks in the group. Furthermore, warehouse management system 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities, and the configuration and quantity of packaging and shipping of items based on one or more groupings and/or current inventory or production levels. For example, the methods described herein may include computers receiving product data from automated machinery having at least one sensor and the product data corresponding to an item detected by the automated machinery. The received product data may include an image of the item, an identifier, as described above, and/or other product data associated with the item (dimensions, texture, estimated weight, and any other like data). The method may further include computers looking up the received product data in a database system associated with the warehouse management system to identify the item corresponding to the product data received from the automated machinery.

Computers 160 may also receive, from one or more sensors 126 of one or more communication devices 120 and/or from sensor 126 associated with one or more communication devices 120, a current location of an identified object. Based on the identification of the object, computers 160 may also identify (or alternatively generate) a first mapping in the database system, where the first mapping is associated with the current location of the identified object. Computers 160 may also identify a second mapping in the database system, where the second mapping is associated with a past location of the identified object. Computers 160 may also compare the first mapping and the second mapping to determine if the current location of the identified object in the first mapping is different than the past location of the identified object in the second mapping. Computers 160 may then send instructions to the automated machinery based, as least in part, on one or more differences between the first mapping and the second mapping such as, for example, to locate items to add to or remove from an inventory of or package for one or more supply chain entities 150.

FIG. 2 illustrates warehouse management system 110 of FIG. 1 in greater detail, according to an embodiment. As discussed above, warehouse management system 110 may comprise server 112 and database 114. Although warehouse management system 110 is shown as a single server 112 and a single database 114, embodiments contemplate any suitable number of servers or databases internal to or externally coupled with warehouse management system 110.

Server 112 of warehouse management system 110 may comprise priority assignment module 202, task assignment module 204 and inventory system module 206. Although a single generation engine 200, a single planning engine 202, a single instruction engine 204, a single interface engine 206, a single transmitter 208 a single priority assignment module 202, a single task assignment module 204 and a single inventory system module 206 are shown and described, embodiments contemplate any number of modules located at one or more locations, external or internal to warehouse management system 110.

According to embodiments, warehouse management system dynamically assigns priorities to tasks and then tasks to workers. In addition, priority assignment module 202 assigns priority to one or more tasks by receiving and grouping tasks, estimating the latest feasible start time of each group, and determining a priority based on the latest feasible start time. Task assignment module 204 assigns tasks to workers. Although the following discussion describes tasks being assigned to workers, according to embodiments, tasks may be assigned to machinery or robotics configured to autonomously complete the task in response to a task assignment from the warehouse management system. In addition, or as an alternative, some workers may have restrictions and permissions, which limit the tasks that may be assigned to that worker. As an example only and not by way of limitation, tasks requiring operating a forklift or handling hazardous material may only be assigned to workers who have the appropriate licensing or safety certification. Some workers may have weight restrictions that limit tasks requiring lifting too much weight. Some tasks may be assigned only to workers with the appropriate security clearance or authority. Although particular example of restrictions and permissions are discussed, embodiments contemplate using any suitable factor to assign tasks to a worker that may perform the task.

According to embodiments, task assignment module 204 assigns a task to workers based on permissions, priority, and proximity, as discussed in more detail below. The task assignment module 204 may also send notifications to perform a task to one or more communication devices 120 associated with a worker or workers that are assigned a task.

In addition, or as an alternative, task assignment module 204 may generate an interface, such as a graphical user interface, comprising one or more interactive elements for selecting and configuring assignment of task strategies. According to embodiments, task assignment module 204 communicates with one or more communication devices 120 to display one or more visual elements and one or more interactive elements on one or more displays. The one or more visual elements may comprise text or graphics that convey information through visual cues. For example, the one or more visual elements may comprise an outline indicating the warehouse boundaries and the work zone area.

The inventory system module 206 is configured to receive, store, and transmit item data, including item location data, inventory levels, and other like data about one or more items at one or more locations in the system. The inventory system module 206 is configured to store and retrieve item information in one or more databases associated with the warehouse management system 110 or the one or more supply chain entities 150.

Database 114 of warehouse management system 110 may comprise one or more databases or other data storage arrangement at one or more locations, local to, or remote from, server 112. Database 114 comprises, for example, task data 212 and worker data 214. Although, database 114 is shown and described as comprising task data 212, and worker data 214, embodiments contemplate any suitable number or combination of these, located at one or more locations, local to, or remote from, warehouse management system 110 according to particular needs.

As discussed above, warehouse management system 110 receives tasks from one or more supply chain entities 150. According to embodiments, warehouse management system 110 stores tasks and related task attributes in task data 212. A task may comprise a picking task, where an item in a first location is moved to a second location, such as packing or unpacking a container, loading or unloading a vehicle, placing items in or removing items from an inventory, transporting items, preparing transportation documentation, and the like. Although tasks are described in connection with warehouse task assignment, embodiments contemplate any suitable tasks associated with any one or more supply chain entities 150.

According to embodiments, warehouse management system 110 stores restrictions and permissions in the worker data 214. Worker data 214 may comprise data associated with workers, including but not limited to, permissions, restrictions, personal information, work zone assignment, current location, identification information, and the like. As explained in more detail below, embodiments of the current disclosure determine and assign priority to tasks based on the latest feasible start time of a task, the current time, and a priority curve that relates the difference between the latest feasible start time and the current time to a priority level. After the priority level is determined, warehouse management system 110 may use the priority, along with other factors, to assign tasks to workers and/or resources. For example, a task may be dynamically assigned to a resource based upon various factors, which may include permissions, priority, and proximity. According to embodiments, permissions comprise permissions of both the worker or operator and the equipment currently used by the operator. For example, warehouse management system 110 may assign to each task the equipment appropriate for that particular task. The second parameter is the priority, or urgency, associated with each task. Priority may be based, at least in part, on precedence constraints, due time, and processing capacity of the supply chain entity. The third parameter is proximity, which indicates the distance between the resource and the task. The distance between the resource and the task represents, for example, the distance a worker must travel from his or her current location, work station, or work zone to the location of the task. As this distance is minimized, efficiency increases because time is not wasted walking around a warehouse. However, as priority of tasks increase, the distance may be increased, which allows more workers to potentially complete the task, which will cause the task to be completed sooner.

According to embodiments, task assignment to workers is based on one or more factors alternative or in addition to permissions, priority, and proximity, as discussed above. For example, proximity is merely one example representing a factor that may be altered based on increasing priority of a task. The higher the priority that is assigned to a task, the higher warehouse management system 110 will allow a cost to be incurred in assigning a task to a worker. With proximity, the cost is allowing a worker to travel increasing distances in the warehouse to complete tasks. Instead of proximity and distance, the cost may be associated with allowing a worker to use a less efficient or slower machine or allowing a worker to process a task singularly, when the task is ordinarily grouped together.

FIG. 3 illustrates an exemplary method 300 of priority assignment according to an embodiment. Although the actions of method 300 are described in a particular order, one or more actions may be performed in one or more combinations or permutations according to particular needs. According to embodiments, warehouse management system 110 receives a queue or to-do list of tasks and priorities to the tasks, which may change the order the tasks are assigned to resources. Attributes associated with each task comprise, for example, a task identification number (TaskID), a task completion time (Due Time), a skills level required to perform the task (Skills), tasks that must be performed prior to the current task (Precedence's), and other like task attributes.

Priority assignment module 202 of server 112 receives tasks from task database and performs a series of actions to determine and associate a priority for the tasks. At action 302, priority assignment module 202 receives one or more task entries from task data 212 of warehouse management system 110 and groups the tasks into one or more groups. At action 304, for each group, priority assignment module 202 estimates the latest feasible start time of the group. At action 306, priority assignment module 202 assigns a priority for the tasks based, at least in part, on the latest feasible start time. At action 308, after the priority of the tasks are determined, priority assignment module 202 generates a priority attribute for each task (or modifies a previous priority attribute) and transmits the task priorities to warehouse management system 110.

At action 310, warehouse management system 110 dynamically updates task priorities, assigns tasks to workers based on the task priorities, and transmits the tasks to one or more communication devices 120 associated with the worker. According to embodiments, priority assignment is performed frequently, such as, for example, every one to fifteen minutes, or any other suitable period of time. Not all tasks will have been assigned to workers in between each call to the priority assignment method 300. The order in which the tasks are assigned to workers will change based on the priority assigned to the tasks by warehouse management system 110.

To further illustrate method 300 of priority assignment, an example is now given.

TABLE 1

| TaskID | Due Time | . . . | TaskID | Due Time |
|--------|----------|-------|--------|----------|
| 11916 | 14:00 | | 11921 | 18:00 |
| 11917 | 14:00 | | 11922 | 18:00 |
| 11918 | 14:00 | | 11923 | 18:00 |
| 11919 | 14:00 | | 11924 | 18:00 |
| 11920 | 18:00 | | 11925 | 18:00 |

In the following example, TABLE 1 illustrates a set of ten tasks received by the priority assignment module 202 from warehouse management system 110, each task is associated with a TaskID and a Due Time. According to one embodiment, priority assignment module 202 divides the set of ten tasks into two task groups based on the due time associated with each task. A first group comprises tasks (TaskIDs: 11916-11919) that are due at 14:00 (i.e. 2:00 PM), and a second group comprises tasks (TaskIDs: 11920-11925) that are due at 18:00 (i.e. 6:00 PM). Although the exemplary set of tasks is shown and described as grouped into two groups according to due time, priority assignment module 202 may group the set of tasks into any number of groups, including subsets of tasks, and by any task grouping parameter, including, for example, due time, destination, importance, or the like. As an example only and not by way of limitation, priority assignment module 202 may create a group for a subset of tasks based on importance of a customer. For example, when orders have been late for an important customer in the past, priority assignment module 202 may create a subset of tasks that prioritizes orders for that customer. In addition, or as an alternative, priority assignment module 202 may create a single group that covers all tasks in the warehouse, to estimate the state of warehouse management system 110.

After grouping the tasks according to a task grouping parameter, priority assignment module 202 calculates the latest feasible start time for tasks in the groups.

FIG. 4 illustrates an exemplary visualization 400 representing the latest feasible start time of the groups of tasks of TABLE 1 according to an embodiment. As discussed above, a first group of tasks comprises (TaskIDs: 11916-11919) that are due at 14:00, and a second group of tasks comprises (TaskIDs: 11920-11925) that are due at 18:00. According to embodiments, priority assignment module 202 calculates the latest feasible start time, for each group of tasks. For example, the latest feasible start time comprises the actual and/or estimated latest time that the group of tasks may be processed to be completed by the due time assuming that all resources are dedicated to these tasks. Priority assignment module 202 may calculate the latest feasible start time using one or more techniques, including, for example, a mathematical model, machine-learning, heuristics, and the like.

In addition, the technique chosen may be used to modulate the process. For large groups of items, the technique chosen must be fast, which may lead to less accurate estimations of the latest feasible start time. For small groups of items, a slower technique may be used, which may increase accuracy. When estimating the latest feasible start time according to one or more mathematical models, priority assignment module 202 may base the latest feasible start time on, for example, due time, precedence constraints, the processing capacity of the warehouse, and the like. According to embodiments, the processing capacity of the warehouse may be based on various factors, such as, for example, the skills required for the tasks, the skills of the warehouse workers, the number of warehouse resources, the productivity level (such as, for example, the processing capacity or the number of tasks processed per unit of time), and the like.

Continuing with the above example, the tasks due at 14:00 are illustrated as tasks 420 and the tasks due at 18:00 are illustrated as tasks 430. Tasks 420 and 430 are ordered so that tasks in a group that need to be completed prior to another task in the same group are assigned an order prior to tasks that are completed later. As illustrated, tasks 420 and 430 are stacked so that tasks that may be completed simultaneously as other tasks are assigned a different level in a stack of tasks. For example, the first group of tasks 420 that are due by 14:00 are placed in two levels, with each level having two tasks, where the tasks on the left of each level are to be completed prior to tasks on the right, and the tasks in the top level may be performed simultaneously as tasks in the bottom level. In addition, the second group of tasks 430 that are due by 18:00 are similarly stacked into two levels and assigned three orders. In addition, the first task in each level of the tasks due at 18:00 are indicated as required to be performed before the second task on the first level. This creates a small gap 412 before the second task on the bottom level.

The latest feasible start time 404 for the first group of tasks 420 that are due by 14:00 is indicated by the leftmost edge of the stack of tasks 404, which, according to this example is approximately 12:00. The latest feasible start time for the second group of tasks 430 that are due by 18:00 is indicated by the leftmost edge of the stack of tasks 430, according to this example is approximately 14:15. After the latest feasible start time 404 and 408 are calculated, priority assignment module 202 assigns priorities to the tasks. For example, assuming the current time 402 is 10:00 (indicated in FIG. 4 as Now) and the latest feasible start time 404 for the first group of tasks 420 due at 14:00 is 12:00, priority assignment module 202 assigns a two-hour margin to the first group of tasks 420. According to embodiments, priority assignment module 202 derives the priority for the first group of tasks 420 from this margin and a priority curve.

Figure 5:
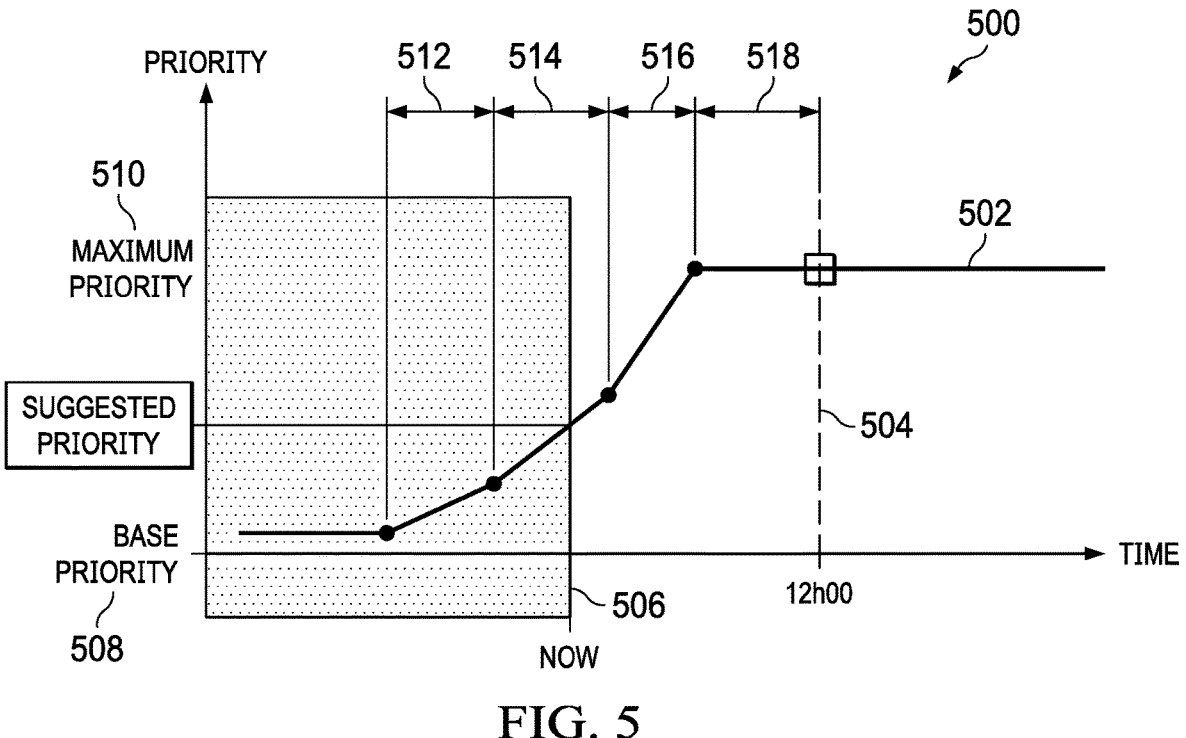
FIG. 5 illustrates an exemplary visualization of a priority curve associated with one or more tasks, according to an embodiment.

FIG. 5 illustrates an exemplary visualization 500 of a priority curve associated with one or more tasks, according to an embodiment. According to embodiments, priority assignment module 202 assigns a priority based, at least in part, on priority curve 502, a piece-wise linear function, where the priority increases with time from a base priority to a maximum priority. Priority curve 502 represents various priority buffers 512-518, where each change in line slope represents a different priority buffer i.e., buffer 512, buffer 514, buffer 516, and buffer 518. In addition, latest feasible start time 504, as calculated above, intersects the x-axis at 12:00. In this example and as shown in FIG. 5, the current time 506 is 10:00. According to an embodiment, the priority for a group is calculated by anchoring priority curve 502 to the latest feasible start time 504 and finding the associated priority buffer 512-518 associated with the current time 506.

Priority assignment module 202 computes the priority with priority curve 502, which assigns increasing priority as the planned start time approaches. Priority curve 502 starts at a base priority buffer 508 and increases step-wise to a maximum priority buffer 510, where each buffer is associated with a range of values for the margin. As the margin decreases from the range of the base priority buffer, it reaches the range of the next priority buffer, which may be a start priority buffer. Each break between priority buffers 508-510 represents a selected or calculated threshold. The thresholds may be based on a suitable mathematical model, simulation of the warehouse, or the like. The control points are based on the buffer of time 512-518 from the due time. The slope of priority curve 502 in each priority buffer 508-510 may be based, at least in part, on operational considerations, such as, shift changes, time and distance to move around the warehouse, and the like. According to embodiments and by using a piece-wise linear approach to assigning slopes, warehouse management system 110 may employ modified slopes throughout a planning horizon. In addition, or as an alternative, priority curve 502 also shifts in time based on the timing of the latest possible amount of work that must be done to meet the task due date.

According to some embodiments, priority curve 502 may comprise any number of buffers 512-518 adapted to any configuration. As an example only and not by way of limitation, the buffers may represent warehouse work zones.

In a warehouse, if the task priority is at a low priority, a worker will not be assigned tasks in another work zone, which increases efficiency. If the task is in a higher priority, the worker will be assigned a task that may not be in the worker's zone, which decreases efficiency. In addition, or as an alternative, the warehouse may be divided into any number or configuration of zones, and the zones may be dynamically created based on various factors. As the priority for a task increases, a worker may be assigned to the task from an increasing number of zones away. When a task has the highest priority, according to embodiments, the task is assigned to a worker in any zone, even from the opposite side of the warehouse.

When priority assignment module 202 assigns priorities, it may also base the priority assignment, at least in part, on the following precedence constraints for priorities assignments. For example, a first rule requires an assigned priority for a preceding task will always have a higher priority than its following task. In other words, if task B should be done after task A, then task A will always have a priority higher than task B. A second rule requires that, for two tasks with the same task type, the task with a later due time than a task of the same type must have a lower priority. That is, when two tasks in the warehouse represent picking items, and one is due by 2:00 PM and the other is due at 4:00 PM, the task at 2:00 PM will always be assigned a higher priority compared with the task at 4:00 PM.

Priority assignment module 202 re-evaluates priorities at a preset interval, continually, or in response to a triggering event, such as completion or assignment of a task, receiving an order for an item, or the like. After the priority assignment module 202 updates the task priorities, warehouse management system 110 assigns tasks to workers based on the task priorities, and transmits the assigned tasks to one or more communication devices 120 associated with the worker.

According to some embodiments, warehouse management system 110 uses grouping to link related tasks together to increase efficiency. For example, when two separate tasks are created to pick two items from inventory and the two items are the same item, warehouse management system 110 may assign a task to the worker that picks the two items at once, eliminating a separate task. In addition, or as an alternative, priority assignment module 202 may be configured to modulate runtime to allow scalability of the method for any size dataset by altering the size of task groups and by altering the technique to estimate the latest feasible start time.

To further illustrate priority assignment method 300, three examples are now given. According to embodiments, the following three examples may be understood with reference to the following mathematical relationships. Let $G_1$ be a first group of tasks. At time $t_1$, the tasks of the first group are assigned priorities based on their latest feasible start time $l_1$. At a later time $t_2 = t_1 + \Delta$, there remains a subset $G_2$ of $G_1$ to be performed. When computing the latest feasible start time $l_2$ of $G_2$. The following provide for three possible situations:

$l_2 - t_2 < l_1 - t_1$ where the margin for performing $G_2$ is smaller than the margin of $G_1$ at $t_1$. Priorities of remaining tasks are now higher causing system to focus more on these tasks. This is the result in Examples 1 and 3.

$l_2 - t_2 = l_1 - t_1$ where the margin for performing $G_2$ is the same as the margin of $G_1$ at $t_1$. Priorities of remaining tasks are the same causing the system to not focus more or less on these tasks.

$l_2 - t_2 > l_1 - t_1$ where the margin for performing $G_2$ is larger than the margin of $G_1$ at $t_1$. Priorities of remaining tasks are now lower causing the system to focus less on these tasks. This is the result in Example 2.

TABLE 2

| TaskID | Due Time |
| --- | --- |
| 111016 | 14:00 |
| 111017 | 14:00 |
| 111018 | 14:00 |
| 111019 | 14:00 |
| 111020 | 14:00 |
| 111021 | 14:00 |
| 111022 | 14:00 |

In the following examples, TABLE 2 illustrates a set of seven tasks received by priority assignment module 202 from warehouse management system 110, each task is associated with a TaskID and a Due Time (TaskIDs: 111016-111022 are due at 14:00 i.e., 2:00 PM). Using the tasks in TABLE 2, priority assignment module 202 assigns a priority to each task using the priority assignment method discussed above. In these examples, because the time is still early in the morning (i.e., the workday) and the tasks are not due until the afternoon (i.e., later in the workday), the priority assigned to the tasks at 8:00 will be a low priority. However, at, for example, 9:00, the priority assigned to each task may increase, according to the priority curve, associated with these tasks.

Figure 6A:
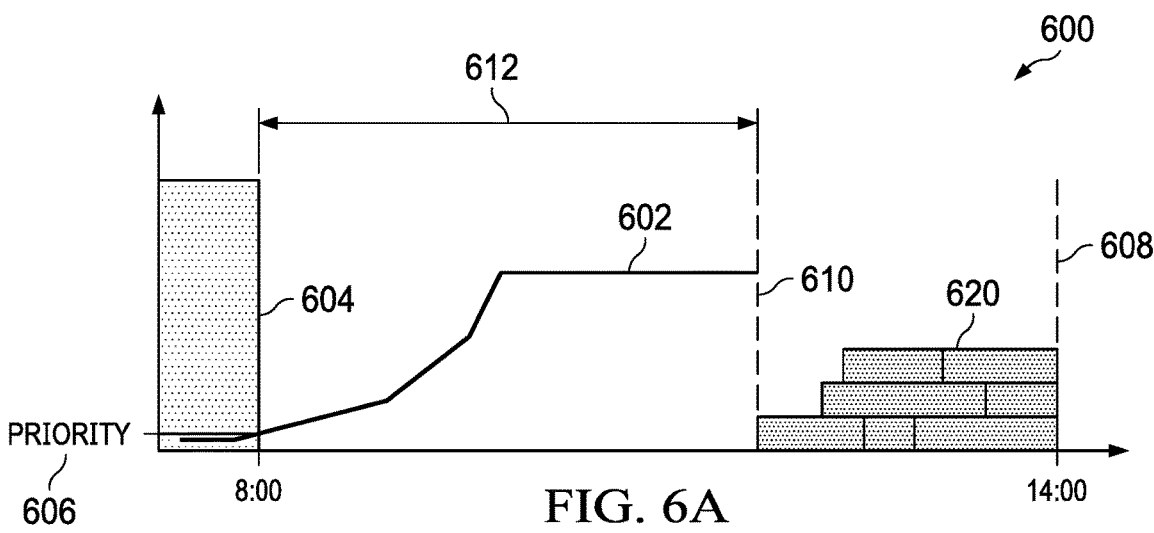
FIGS. 6A and 6B illustrate an exemplary visualization representing the priority assignment for the tasks of TABLE 2, where no tasks are completed, according to an embodiment.
Figure 6B:
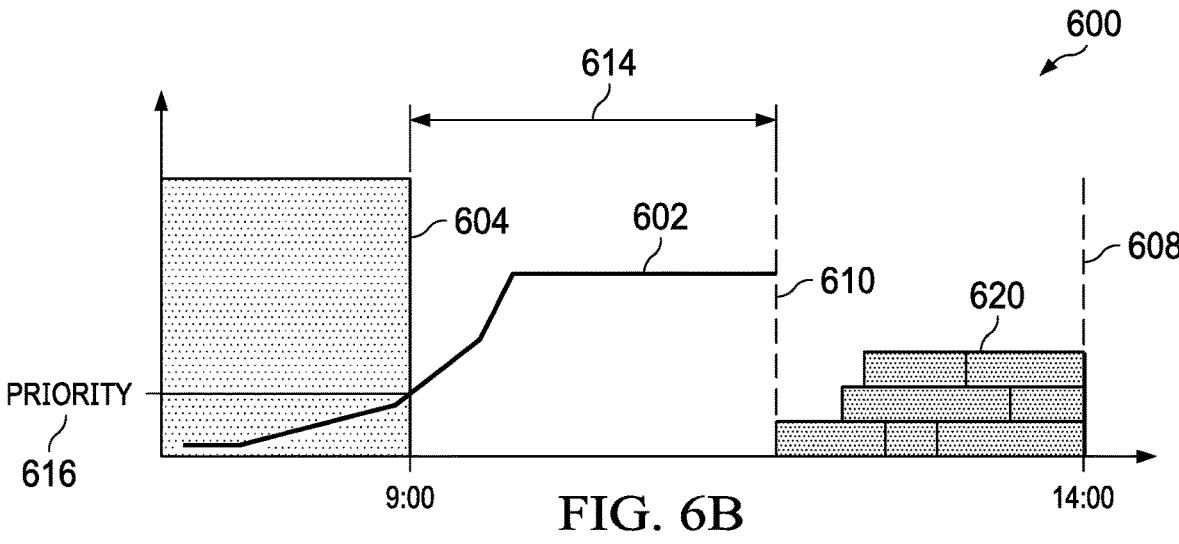

FIGS. 6A and 6B illustrate an exemplary visualization 600 representing the priority assignment for the tasks of TABLE 2, where no tasks are completed, according to an embodiment. As shown in TABLE 2, each task (TaskIDs: 111016-111022) are associated with a Due Time 608 of 14:00 i.e., 2:00 PM. The priority 606 and 616 of tasks 620 at any time is indicated by the intersection of priority curve 602 and the current time 604. As illustrated in FIG. 6B, none of tasks 620 were completed between 8:00 and 9:00 (because, for example, the warehouse workers may have been busy with other tasks), so the latest feasible start time 610 did not change, however, the priority 616 assigned to tasks 620 increased as compared with the priority 606 of FIG. 6A.

In addition, and as discussed above in FIG. 6A, because none of the tasks 620 were completed between 8:00 and 9:00, the latest feasible start time 610 remains the same, while the current time 604 increased in FIG. 6B, which results in a smaller margin 614 at 9:00 compared with a larger margin 612 at 8:00. Because the margin 614 decreased relative to the margin 612, the priority 616 increased relative to the priority 606. However, according to embodiments, the margins 612 and 614 and the priorities 606 and 616 of the group of tasks 620 would be different, if enough of the tasks 620 had been completed, as illustrated in the following example.

Figure 7:
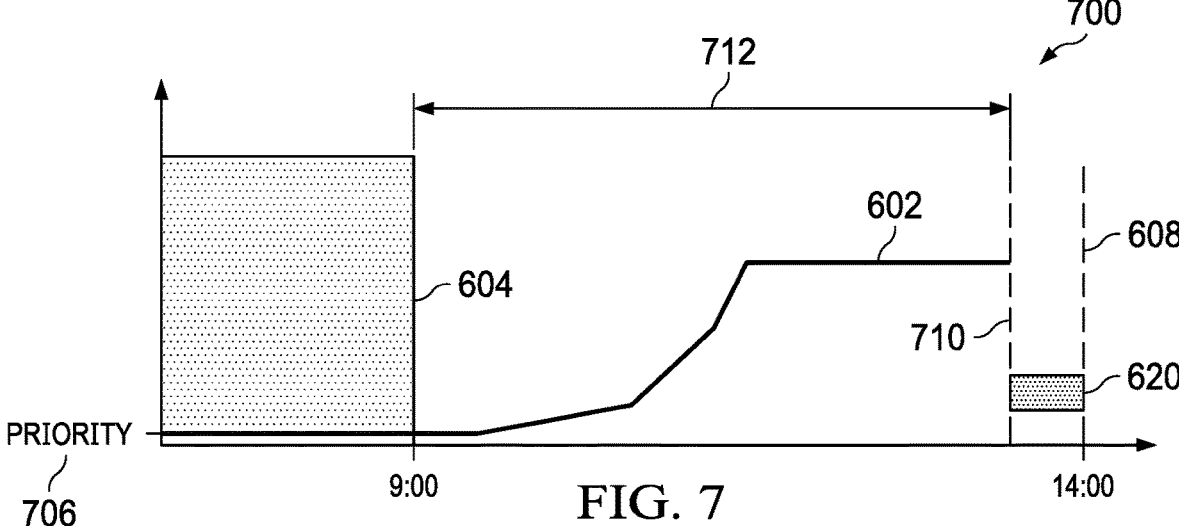
FIG. 7 illustrates an exemplary visualization of the priority assignment for the tasks of TABLE 2, where all but one task from the group of tasks have been completed, according to an embodiment.

FIG. 7 illustrates an exemplary visualization 700 of the priority assignment for the tasks of TABLE 2, where all but one task from the group of tasks have been completed, according to an embodiment. As shown in TABLE 2, the remaining task of the group of tasks (TaskIDs: 111016-111022) are associated with a Due Time 608 of 14:00 i.e., 2:00 PM. Instead of failing to complete any task by 9:00, as in the previous example of FIGS. 6A-6B, all but one task has been completed by 9:00 in FIG. 7, which results in a longer margin 712 and a lower priority 706. In addition, as discussed above, the priority 706 of tasks 620 at any time is indicated by the intersection of priority curve 602 and the current time 604. As illustrated in FIG. 7, because all, but one, of tasks 620 were completed between 8:00 and 9:00, the latest feasible start time 710 changed and the priority 706 assigned to tasks 620 decreased as compared with the priority 606 and 616 of FIGS. 6A and 6B.

In addition, and after all but one of the tasks were completed, the latest feasible start time 710 is further in the future than it was when the current time 604 was 8:00. In this example, the latest feasible start time 710 decreased more than the current time 604 increased, which results in a longer margin 712 at the current time 604 of 9:00 compared with current time 604 of 8:00. According to embodiments, priority curve 602 is anchored at the latest feasible start time 604, and the priority 706 is updated to the value at the intersection of the priority curve 602 and the current time 604. Because the margin 712 increased relative to the margin 612 of FIG. 6A, the priority 706 decreased relative to the priorities 606 and 616 of FIGS. 6A and 6B. The decreased priority 706 indicates that the last task 620 does not need to be rushed and tasks from other groups may need to be prioritized.

TABLE 3

| TaskID | Due Time |
|--------|----------|
| 120153 | 14:00 |
| 120154 | 14:00 |
| 120155 | 14:00 |
| 120156 | 14:00 |

Figure 8:
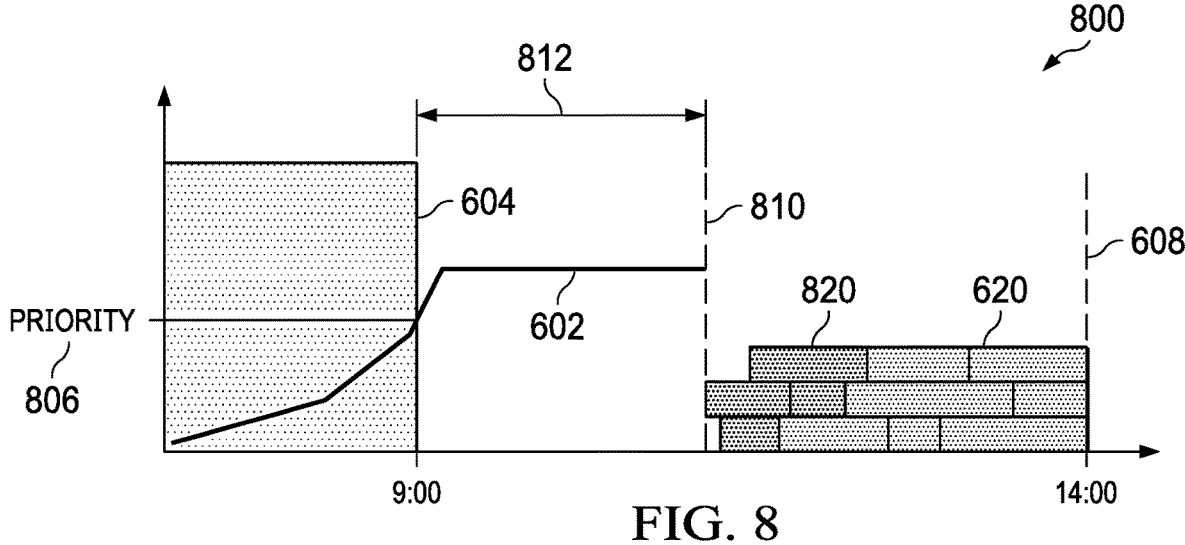
FIG. 8 illustrates an exemplary visualization 800 of the priority assignment for the tasks of TABLE 2, where no tasks are completed, and additional tasks of TABLE 3 are added, according to an embodiment.

FIG. 8 illustrates an exemplary visualization 800 of the priority assignment for the tasks of TABLE 2, where no tasks are completed, and additional tasks of TABLE 3 are added, according to an embodiment. TABLE 3 illustrates a set of four tasks received by priority assignment module 202 from warehouse management system 110, each task (TaskIDs: 120153-120156 are associated with a Due Time 608 of 14:00 i.e., 2:00 PM. Using the tasks in TABLES 2 and 3, priority assignment module 202 assigns a priority to each task using the priority assignment method discussed above. As illustrated in FIG. 8, none of tasks 620 were completed between 8:00 and 9:00 and additional tasks 820 were added between 8:00 and 9:00, so the latest feasible start time 810 changed, and the priority 806 assigned to tasks 620 and 820 increased as compared with the priority 606 of FIG. 6A.

In addition, because the list of tasks 620 and 820 due at Due Time 608 of 14:00 has increased, the latest feasible start time 810 is decreases, which results in a smaller margin 812 at 9:00 compared with a larger margin 612 at 8:00 of FIG. 6A. The margin 812 has decreased substantially at the current time 604 of 9:00 resulting in the priority 806 increasing substantially. In other words, the latest feasible start time 810 is sooner and the current time 604 is later, so the priority 806 increases to account for the shorter amount of time to handle an even higher workload.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A warehouse management system, comprising:
a task database and a server comprising a processor and memory, the server configured to:
receive product data from automated machinery having at least one sensor, wherein the product data corresponds to items detected by the automated machinery;
group one or more tasks from the task database into one or more groups;
estimate a latest feasible start time for each group of the one or more groups;
assign a priority based on a priority curve for the one or more tasks in each group based on the estimated latest feasible start time for each group, wherein the priority curve is generated using a piecewise linear approach;
determine the priority of a task and in response to a determination that the priority of the task is at a high priority, assign a worker a task that is not in the worker's work zone, wherein the worker comprises the automated machinery selected from the group consisting of robotic warehouse systems, robotic inventory systems, automated guided vehicles, mobile racking units, automated robotic production machinery, and robotic devices; and
communicate electronically over a network to assign the task to the automated machinery, wherein the automated machinery autonomously completes the task in response to the task assignment from the warehouse management system, and further wherein the task comprises adjusting inventory of the items at one or more stocking points.

2. The warehouse management system of claim 1, wherein a worker is assigned a task based on the priority associated with the task.

3. The warehouse management system of claim 2, wherein the priority curve comprises:
a base priority buffer;
a maximum priority buffer;
at least one intermediate priority buffer between the base priority buffer and the maximum priority buffer, wherein each buffer is associated with a range of values for a margin, the margin representing a difference between a current time and the latest feasible start time; and
a slope of the priority curve is different for at least two of the buffers.

4. The warehouse management system of claim 3, wherein each buffer represents one or more work zones in a warehouse.

5. The warehouse management system of claim 1, wherein the server is further configured to:
link related tasks by grouping at least two separate tasks when the at least two tasks are to pick two items from inventory and the two items are a same item;
assign the linked related task to the worker to pick the two items at a same time.

6. A computer-implemented method, comprising:
receiving product data from automated machinery having at least one sensor, wherein the product data corresponds to items detected by the automated machinery;
grouping one or more tasks from a task database into one or more groups;
estimating a latest feasible start time for each group of the one or more groups;
assigning a priority based on a priority curve for the one or more tasks in each group based on the estimated latest feasible start time for each group, wherein the priority curve is generated using a piecewise linear approach;

determining the priority of a task and in response to a determination that the priority of the task is at a high priority, assign a worker a task that is not in the worker's work zone, wherein the worker comprises the automated machinery selected from the group consisting of robotic warehouse systems, robotic inventory systems, automated guided vehicles, mobile racking units, automated robotic production machinery, and robotic devices; and communicating electronically over a network from a warehouse management system to assign the task to the automated machinery, wherein the automated machinery is configured to autonomously completes the task in response to the task assignment from the warehouse management system, and further wherein the task comprises adjusting inventory of the items at one or more stocking points.

7. The method of claim 6, wherein a worker is assigned a task based on the priority associated with the task.

8. The method of claim 6, wherein the priority curve comprises:

a base priority buffer;

a maximum priority buffer;

at least one intermediate priority buffer between the base priority buffer and the maximum priority buffer, wherein each buffer is associated with a range of values for a margin, the margin representing a difference between a current time and the latest feasible start time; and a slope of the priority curve is different for at least two of the buffers.

9. The method of claim 8, wherein each buffer represents one or more work zones in a warehouse.

10. The method of claim 6, further comprising:

linking related tasks by grouping at least two separate tasks when the at least two tasks are to pick two items from inventory and the two items are a same item;

assigning the linked related task to the worker to pick the two items at a same time.

11. A non-transitory computer-readable medium embodied with software, the software when executed configured to:

receive product data from automated machinery having at least one sensor, wherein the product data corresponds to items detected by the automated machinery;

group one or more tasks from a task database into one or more groups;

estimate a latest feasible start time for each group of the one or more groups;

assign a priority based on a priority curve for the one or more tasks in each group based on the estimated latest feasible start time for each group, wherein the priority curve is generated using a piecewise linear approach;

determine the priority of a task and in response to a determination that the priority of the task is at a high priority, assign a worker a task that is not in the worker's work zone, wherein the worker comprises the automated machinery selected from the group consisting of robotic warehouse systems, robotic inventory systems, automated guided vehicles, mobile racking units, automated robotic production machinery, and robotic devices; and communicate electronically over a network from a warehouse management system to assign the task to the automated machinery, wherein the automated machinery is configured to autonomously completes the task in response to the task assignment from the warehouse management system, and further wherein the task comprises adjusting inventory of the items at one or more stocking points.

12. The non-transitory computer-readable medium of claim 11, wherein a worker is assigned a task based on the priority associated with the task.

13. The non-transitory computer-readable medium of claim 11, wherein the priority curve comprises:

a base priority buffer;

a maximum priority buffer;

at least one intermediate priority buffer between the base priority buffer and the maximum priority buffer, wherein each buffer is associated with a range of values for a margin, the margin representing a difference between a current time and the latest feasible start time; and a slope of the priority curve is different for at least two of the buffers.

14. The non-transitory computer-readable medium of claim 13, wherein each buffer represents one or more work zones in a warehouse.

15. The non-transitory computer-readable medium of claim 11, wherein the software when executed is further configured to:

link related tasks by grouping at least two separate tasks when the at least two tasks are to pick two items from inventory and the two items are a same item;

assign the linked related task to the worker to pick the two items at a same time.

* * * * *